United States Patent [19]
Milstein et al.

[11] 3,849,288
[45] Nov. 19, 1974

[54] MANUFACTURE OF TRANSFORMER OILS

[75] Inventors: Donald Milstein, Cherry Hill; Donald F. Hill, Woodbury, both of N.J.

[73] Assignee: Mobil Oil Corporation, New York, N.Y.

[22] Filed: Mar. 26, 1973

[21] Appl. No.: 344,817

[52] U.S. Cl. .................. 208/14, 208/99, 208/144, 208/264
[51] Int. Cl. ............................................ C10g 23/02
[58] Field of Search .............. 208/14, 99, 144, 264

[56] References Cited
UNITED STATES PATENTS

| | | | |
|---|---|---|---|
| 3,000,807 | 9/1961 | Wasson et al. | 208/14 |
| 3,252,887 | 5/1966 | Rizzuti | 208/14 |
| 3,551,324 | 12/1970 | Lillard | 208/14 |
| 3,640,868 | 2/1972 | Rocchini et al. | 208/14 |

*Primary Examiner*—Herbert Levine
*Attorney, Agent, or Firm*—Andrew L. Gaboriault; Raymond W. Barclay

[57] ABSTRACT

Transformer oils are manufactured by catalytic hydrogenation of selected petroleum charge stocks under critical temperature conditions.

8 Claims, 2 Drawing Figures

MANUFACTURE OF TRANSFORMER OILS

BACKGROUND OF THE INVENTION

1. Field of the Invention

This invention relates to a process for manufacturing transformer oils, by catalytic hydrogenation of a selected petroleum charge stock.

2. Description of the Prior Art

Manufacture of transformer oils has heretofore been commercially carried out by acid treating specific hydrocarbon oil distillates followed by clay percolation of the so treated distillate. Such refining procedures have been expensive to operate, giving rise to corrosion problems; have resulted in waste of oil and have created a major problem with respect to disposal of the spent acid treating solutions, particularly in light of environmental considerations.

In view of the above, attempts have been made in the past to obtain a transformer oil of acceptable properties by hydrotreating a petroleum distillate. As those in the art are aware, production of transformer oils useful in providing electrical insulation and conducting heat away from the transformer requires an exacting procedure to provide a highly refined oil possessing the requisite characteristics of high dielectric strength, low viscosity, low specific gravity, high electrical resistivity, low evaporation rate, low pour point, non-emulsifying tendency and slow rate of sludge formation. Such prior attempts to obtain a commercially acceptable hydrotreated transformer oil did not prove successful. The product resulting from such operation had serious deficiencies, notably poor resistance to breakdown during exposure to voltage surges and excessive formation during use of unwanted sludge.

SUMMARY OF THE INVENTION

In accordance with the present invention, it has been found that by hydrotreating a naphthenic distillate, such as obtained from distillation of a Coastal crude, in the presence of a hydrogenation catalyst at a critical temperature greater than 525°F. but less than 575°F. preferably at about 550°F. that not only an acceptable but a highly improved transformer oil is realized without involvement of acid treatment with its accompanying above-noted disadvantages. Operation outside the specified critical temperature range results in an undesired product. Thus, operation above 575°F. gives a product susceptible to sludge formation and product made below 525°F. has poor impulse strength.

The petroleum charge stock employed is a naphthenic distillate boiling in the range of about 450°F. to about 775°F., typically in the approximate range of 525°F. to 700°F. Generally, such distillate will have an aromatics content less than 30 percent usually 18 to 25 percent; an alkane content less than 5 percent, the balance being substantially all naphthenes and having a flash point not less than about 275°F., a viscosity at 100°F. of from about 55 to about 75 SUS preferably about 58 and a specific gravity of about 0.865 to about 0.905. In particular, the transformer oils in accordance with the present invention are produced by treatment of a naphthenic distillate having a sulfur content less than 1 weight percent, a flash point in the range of about 200° to about 350°F. and a pour point below -40°F. Thus, the charge stock utilized in the process of this invention can be a hydrocarbon oil distillate obtained from any available crude naphthenic petroleum oil. Such hydrocarbon oil distillates may be obtained by vacuum distillation of naphthenic crude oils such as Coastal crude oils.

DESCRIPTION OF SPECIFIC EMBODIMENTS

Figure 1:
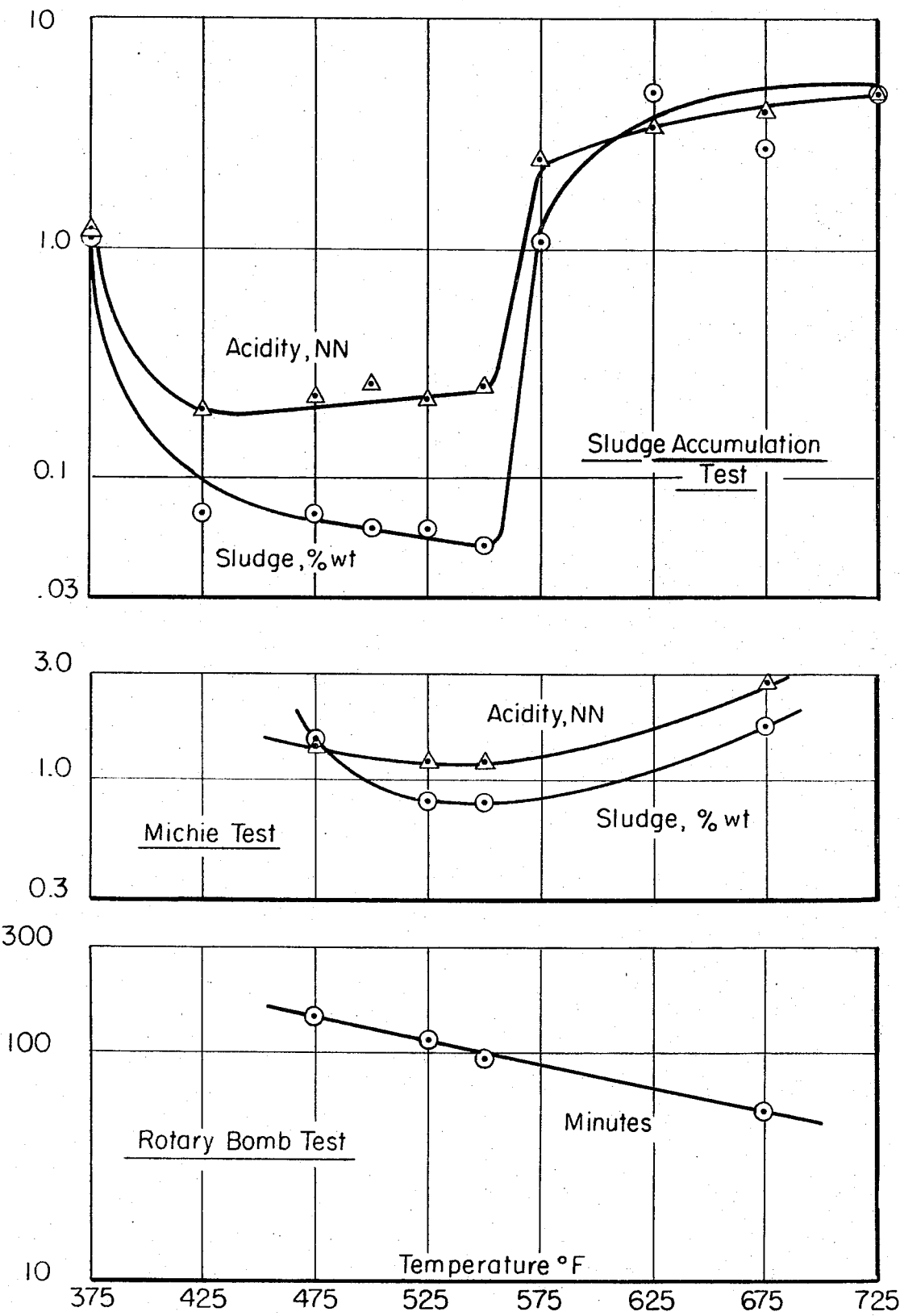

The reaction conditions, essential for the manufacture of improved transformer oils in the present process, involve a temperature of not less than 525°F. and below 575°F. Preferably, a temperature of 550°F. is employed, resulting in a highly effective balance between oxidation stability and highly satisfactory electrical properties. If a temperature below 525°F. is employed, the resulting product has poor resistance to breakdown upon exposure to voltage surges, such characteristic normally being termed impulse strength. If a temperature of 575°F. or higher is employed, undesirable sludge formation is encountered. It is, accordingly, an essential feature of this invention to obtain the improved transformer oil product that a temperature not less than 525°F. and below 575°F. be used during the hydrotreating operation.

The contact of the above-described petroleum charge stock with hydrogen takes place at a pressure in the range from about 200 psig to about 5,000 psig, with the most preferable pressure range being from about 250 to about 1,000 psig. Space velocities which may be employed range from about 0.2 volume of feed charge stock per hour per volume of catalyst to about 5 volumes and preferably from about 0.5 to about 2 volumes of feed stock per hour per volume of catalyst. The hydrogen circulation rate may range from about 250 to about 15,000 s.c.f. per barrel of charge, preferably in the range of about 500 to about 2,000 s.c.f. per barrel of charge. Contact between the charge stock and hydrogen may be carried out in any equipment suitable for catalytic hydrogenation, generally employing a fixed bed operation.

The catalyst used in the present process is preferably a sulfur-resistant, non-precious metal, hydrogenation catalyst such as those conventionally utilized in hydrogenation of petroleum oils. Representative catalyst components include tin, vanadium, metals of Groups VIB, i.e., chromium, molybdenum and tungsten and metals of Group VIII, particularly those of the iron group, i.e., iron, cobalt and nickel. These metals are generally present in minor, catalytically effective amounts, such as from about 2 to 30 weight percent of the catalyst and may be present in elemental form or in combined form such as the oxides or sulfides of such metals, with the sulfide form being accorded preference. In particular, it is desirable to use mixtures of the above metals or their oxides or sulfides. For example, mixtures of metals of the iron group, their metal oxides or sulfides with metals, their oxides or sulfides of Group VIB metals are satisfactory catalysts. Examples of such mixtures include nickel molybdate, chromate or tungstate or mixtures of nickel or cobalt oxides with molybdenum, tungsten or chromium oxides. These catalytic components are usually employed in composite with a suitable carrier, such as silica, alumina, silica-alumina, silica-zirconia or alumina-titania. Nickel sulfide, nickel molybdenum sulfide, tungsten disulfide, nickel-tungsten sulfide and molybdenum sulfide, as such, or in conjunction with a carrier are also contemplated for use as catalysts in the present process. Particularly preferred are catalysts containing about 1 to about 10 weight percent of an iron group metal and about 5 to about 25 weight percent of a Group VIB metal, expressed as the oxide. Representative of such preferred catalysts are nickel molybdate or cobalt molybdate supported on alumina.

Clay finishing of the catalytically hydrotreated product is necessary to achieve the improved transformer oil described herein. Thus, the hydrotreated oil is subjected to clay percolation utilizing clays of the type normally used in clay finishing such as for example bauxite, fullers earth, attapulgus or Filtrol clays which may be previously activated for filtering and/or decolorizing purposes by treating at a temperature of from 400° to 900°F. Generally, clay percolation of the hydrotreated product will be carried out at ambient atmospheric temperatures, e.g., 60°F. but moderately elevated temperatures not exceeding about 225°F. may be used if desired. The volume ratio of oil to clay employed during the percolation step is preferably between about 5 and about 10.

The transformer oil product resulting from the hydrotreating process described herein and after clay percolation, has been found to possess a long useful life, to be characterized by highly effective electrical characteristics such as requisite impulse strength and to be particularly resistant to sludge accumulation during use.

In order to evaluate the oxidation stability and electrical characteristics of the transformer oil product, it was subjected to several tests hereinafter described:

The Sludge Accumulation Test, also designated as ASTM D2440, serves to evaluate the acid and sludge-forming tendency of a transformer oil. More particularly, it evaluates the propensity of an oil to form acids and deposit an insoluble sludge under prescribed conditions of oxidation in the presence of copper catalyst for a fixed period of time, such as 3 days, 7 days or 14 days. Briefly, this test involves contact of a 25 gram oil sample with oxygen in the presence of a copper wire catalyst at 110°± 0.5°C. for the specified period of time, e.g., 3 days. After the required period of oxidation, the sample is cooled for 1 hour to room temperature. Then, the copper catalyst is removed. The oxidized oil is transferred to a 500 ml Erlenmeyer flask and 300 ml of n-heptane are added. The mixture is permitted to stand for 24 hours at 20°± 2°C. and then filtered through a glass filter. The collected sludge is washed with n-heptane. The filter containing the sludge is dried at 110°C. Sludge adhering to the catalyst, test receptable, oxygen delivery tube and 500 ml Erlenmeyer flask is dissolved in 30 ml of chloroform and transferred to a tared porcelain vessel. This is dried at 110°C., after evaporation of the chloroform, to constant weight. The weight of the resulting residue is added to that of the sludge obtained by precipitation with n-heptane. The total sludge is expressed as a percentage of the initial weight of the oil as follows:

Sludge, percent = Weight of sludge/Weight of oil sample × 100.

The neutralization value is determined by collecting the heptane solution after filtering off the sludge in a 500 ml volumetric flask, diluting to the mark and using a 100 ml sample. To such sample is added 0.5 ml of p-naphtholbenzein indicator solution and the resulting mixture is titrated with 0.1N alcoholic potassium hydroxide solution. The neutralization value in milligrams of KOH per gram of oil is calculated as follows:

Neutralization value = $(N_2-N_1)$ 5.61/5 where:

$N_2$ = milliliters of 0.1N KOH solution necessary to neutralize the n-heptane solution $N_1$ = milliliters of 0.1N KOH solution necessary to neutralize 100 ml of n-heptane to which have been added 100 ml of the titrating solution 5.61 = milligrams of KOH per milliliter of 0.1N solution and 5 = grams of oil in 100 ml of heptane The Michie Test, also designated as IP 56/64, measures the tendency of a transformer oil to deteriorate when oxidized under specified conditions. The extent of deterioration is evaluated by determining the amount of sludge formed and the acidity developed. It is somewhat similar to the Sludge Accumulation Test described above but there are a number of differences both in apparatus and procedure. Briefly, a 100 gram oil sample is placed in a reaction flask, to which is added a piece of copper sheet rolled into a cylinder. With the reaction flask maintained at 150°± 0.5°C., air is passed into the oil sample at a rate of 2 liters per hour for a period of 45 hours. At the end of such time, the contents of the flask, except for the copper cylinder, are transferred to a beaker and n-heptane is added to a total volume of 450 ml. The mixture is stirred and permitted to stand in the dark for 16–24 hours for the sludge to separate. The separated sludge is removed by filtration and washed with n-heptane. Deposits adhering to the flask, copper cylinder and air-inlet tube are removed with chloroform. The resulting chloroform extract is transferred to a flask, the chloroform removed by evaporation and the flask and contents dried at about 100°C., cooled and then weighed. The combined weights of the chloroform extract and sludge are determined and the value obtained expressed as a percentage of the original sample.

The acidity of the oxidized oil is determined by transferring the combined filtrate and washings to a 1,000 ml measuring cylinder and after diluting with n-heptane to a convenient volume which shall be a multiple of 100 ml, measuring 100 ml of the resulting solution into a 500 ml vessel. To such vessel is added 50 ml of alcohol containing 3 ml of alkali blue solution. The alcohol mixture is neutralized with 0.1N KOH solution and the neutralized alcohol is added to the vessel containing the 100 ml of n-heptane solution. The resulting mixture, after shaking, is titrated with 0.1N KOH solution. The acidity is calculated from the formula:

$$A = 0.00561 \text{ VNR}$$

where $A$ is the acidity in mg KOH/g of sample; $V$ is the volume of the KOH solution in ml; $N$ is the normality of the KOH solution and $R$ is the total of the n-heptane solution.

The Rotary Bomb Test, also designated as ASTM D2112, is a rapid method for the evaluation of the oxidation stability of a transformer oil. The sample is agitated by rotating axially at 100 rpm at an angle of 30° from the horizontal under an initial oxygen pressure of 90 psi in a copper bomb with a glass sample container and copper catalyst coil, in the presence of water at 140°C. The time for an oil to react with a given volume of oxygen is measured. The recorded pressure versus time is observed and a plateau pressure established. The bomb life of the sample is the time in minutes from the start of the test to a 25 psi pressure drop from the level of the established plateau.

The G.E. Bomb Sludge Test, also designated as ASTM D1313, is concerned with evaluated of the sludge-forming tendency of transformer oils by means of high pressure oxidation. A 50 ml oil sample is introduced into a receptacle which is placed in a bomb. Oxygen is introduced into the bomb to a pressure of 250 psi while maintaining the oil sample at a temperature of 140°C. The oxidation period is continued for 24 hours. Thereafter, the oxidized oil is transferred to a beaker and diluted to 200 ml with petroleum naphtha. The resulting mixture is stirred until the oil is dissolved, after which it is permitted to stand at 25°± 2°C. for 1 hour. Sludge is then removed from the mixture by filtration and the weight of the dried sludge determined. The Bomb Sludge value is calculated as follows:

Bomb Sludge value = Wt. of total sludge/Wt. of oil × 100.

Resistivity of a transformer oil is determined by ASTM D1169 and is a measure of its electrical insulating properties. High resistivity reflects a low content of free ions and ion-forming particles and normally indicates a low concentration of conductive contaminants. More precisely, resistivity or specific resistance is the ratio of the d-c potential gradient in volts per centimeter paralleling the current flow within the test specimen to the current density in amperes per square centimeter at a given instant of time and under prescribed conditions. This is numerically equal to the resistance between opposite faces of a cubic centimeter of the liquid and is measured in ohm-centimeters.

Impulse strength is determined by the G.E. Impulse Strength Test, as described in Electrical World, Apr. 7, 1969, pages 38–40. This involves placing an oil sample in a test cell for a non-uniform field having a grounded ½ inch polished brass sphere as the lower electrode and a phonograph needle vertically aligned 1 inch above it as the upper electrode. The voltage wave is applied to the needle with the initial voltage level well below anticipated breakdown. Three impulses are applied for each step. If no failure is obtained, the impulse voltage is increased by 10 kv and the test is repeated. This process is repeated until a failure is obtained. The voltage at which breakdown occurs is reported in the impulse strength in kv.

The following examples will serve to illustrate the process of this invention and the improved transformer oil product obtained therefrom:

EXAMPLE 1

A charge stock of a Coastal 58 inches distillate was employed having the following properties:

| | |
|---|---|
| Gravity, °API | 26.2 |
| Specific gravity | .8973 |
| Viscosity, SUS at 100°F. | 58 |
| Viscosity, KV at 100°F. | 9.85 |
| Pour Point, °F. | <−35 |
| Flash Point, °F. | 300 |
| Sulfur, % wt. | 0.22 |
| Aniline point, °F. | 152.3 |
| Distillation, °F. | |
| IBP | 526. |
| 5% | 562 |
| 10% | 574 |
| 20% | 584 |
| 50% | 615 |
| 80% | 660 |
| 90% | 685 |
| 95% | 705 |

Such charge was contacted with a catalyst of nickel molybdate on alumina. The catalyst contained about 3.2 weight percent nickel oxide and about 15.1 weight percent molybdenum oxide. Contact was made at a temperature of 550°F. in the presence of hydrogen at a space velocity of 1.0 volumes of oil per hour per volume of catalyst, a hydrogen partial pressure of 500 psig, utilizing a hydrogen circulation rate of 1,000 s.c.f. per barrel.

The product resulting from this hydrotreating step was percolated through clay, the volume ratio of oil to clay being 5.

Comparison is shown in Table 1 below between the hydrotreated transformer oil with a conventional acid treated oil.

TABLE 1

Comparison of Hydrotreated Transformer Oil With Acid-Treated Oil

| | Hydrotreated | Acid-Treated |
|---|---|---|
| Simulated Transformer Test | | |
| Months to Failure: 30+ | 21 | |
| Electrical Tests | | |
| G.E. Impulse Strength, KV: | 150 | 150 |
| Resistivity at 100°C., 10¹² OHM.CM: | 30 | 34 |
| Oxidation Tests | | |
| Sludge Accumulation Test | | |
| 3-Day, % wt/NN | .03/.15 | .03/.11 |
| 7-Day, do. | .06/.24 | .07/.22 |
| 14-Day, do. | .11/.24 | .12/.27 |
| Michie Test, % wt/NN | 0.8/0.9 | 1.0/1.6 |
| G.E. Bomb Sludge, % wt. | 0.04 | 0.03 |
| Rotary Bomb, minutes: | 95 | 120 |
| Chemical & Physical | | |
| Gravity, °API | 27.1 | 27.7 |
| Viscosity, SUS at 100°F. | 58 | 58 |
| Aniline Point, °F. | 156 | 163 |
| Flash Point, °F. | 300 | 305 |
| N.N., Mg KOH/g | 0.0 | 0.01 |

As will be evident from the results in the above table, the hydrotreated oil still performs adequately after 30 months while the acid-treated oil failed after 21 months. Both oils had the same impulse strength rating, i.e., 150 KV, and gave comparable results in the other reported tests.

EXAMPLES 2–5

The process of Example 1 was repeated with variation in the hydrotreating temperature. The results are set forth below in Table 2, showing the effect of hydrotreating temperature on transformer oil properties.

TABLE 2

Effect of Hydroprocessing Temperature On Transformer Oil Properties

| Example | 2 | 3 | 1 | 4 | 5 |
|---|---|---|---|---|---|
| Temperature, °F. | 475 | 525 | 550 | 575 | 625 |
| Simulated Transformer Test | | | | | |
| Months to Failure | — | 18 | 30+ | — | — |
| Electrical Tests | | | | | |
| G.E. Impulse Strength, KV | 117 | 140 | 150 | — | 148 |
| Oxidation Tests | | | | | |
| 3-Day Sludge Acc., % wt/NN | .07/.23 | .06/.22 | .03/.15 | 1.1/2.5 | 4.9/3.4 |
| Bomb Sludge, % wt. | 0.04 | 0.03 | 0.04 | — | 0.15 |
| Rotary Bomb, minutes | 143 | 115 | 95 | — | 55 |

EXAMPLE 6

A process similar to that of Example 1 was carried out but utilizing as charge a 10–90 percent cut of the charge stock employed in Example 1, i.e., boiling in the range of about 580° to about 680°F.

The product resulting from treatment of this oil had an exceptionally high impulse strength of 180 as evidenced from the results shown in the table below.

TABLE 3

| | |
|---|---|
| Oxidation Tests | |
| 3-Day Sludge Accum., % wt/NN | .01/.11 |
| 7-Day Sludge Accum., % wt/NN | .13/.34 |
| 14-Day Sludge Accum., % wt/NN | .17/.48 |
| Michie Test, % wt/NN | 1.6/2.2 |
| Bomb Sludge, % wt | .07 |
| Rotary Bomb, min. | 63 |
| Electrical Tests | |
| Impulse Strength, KV | 180 |
| Resistivity at 100°C. | 112 |
| Chemical & Physical Properties | |
| Gravity, API | 27.2 |
| Color, Saybolt | +27 |
| Moisture, ppm wt. | <8 |
| Distillation, °F. | |
| 5% | 580 |
| 20% | 598 |
| 50% | 616 |
| 80% | 647 |
| 95% | 679 |

Figure 2:
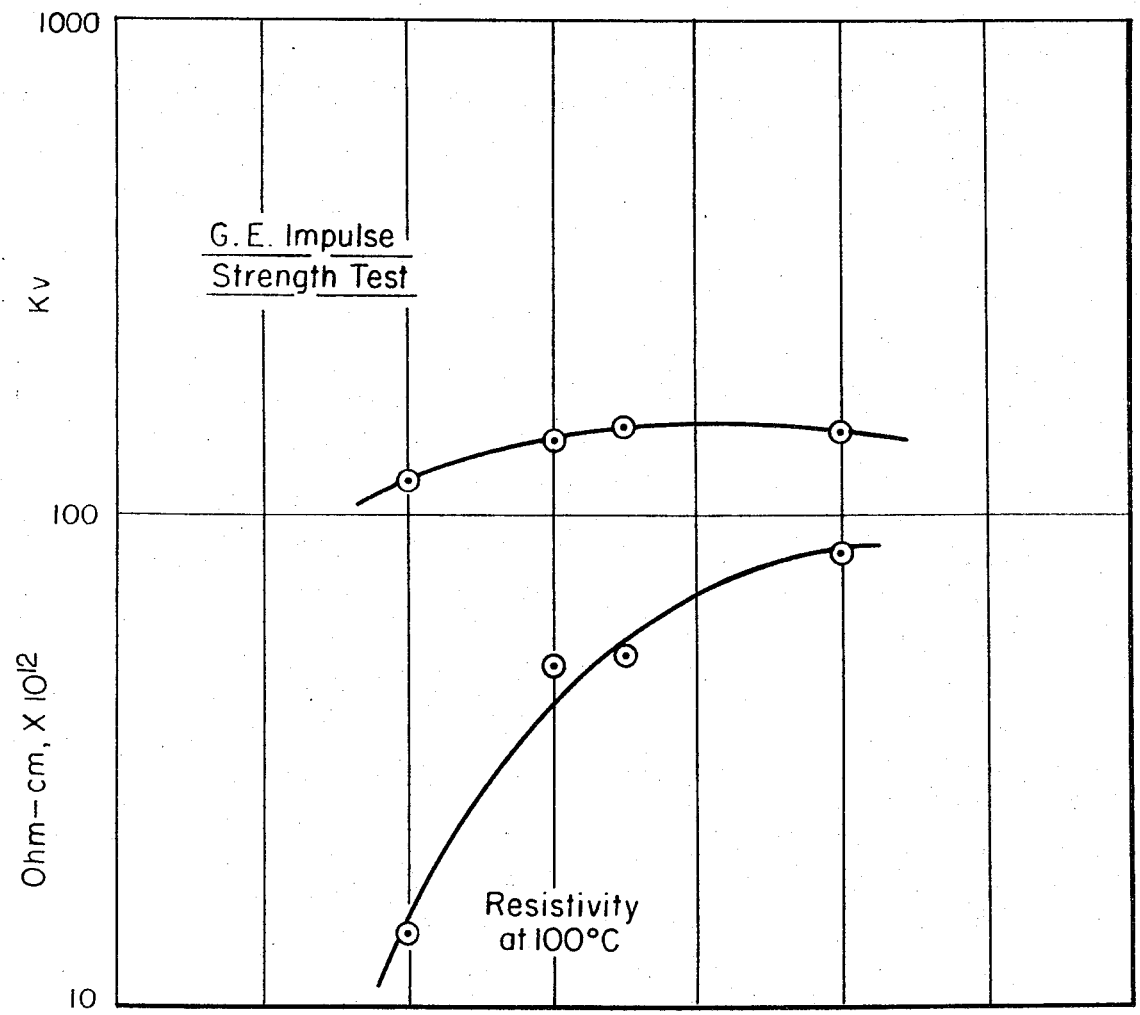
Figure 2:
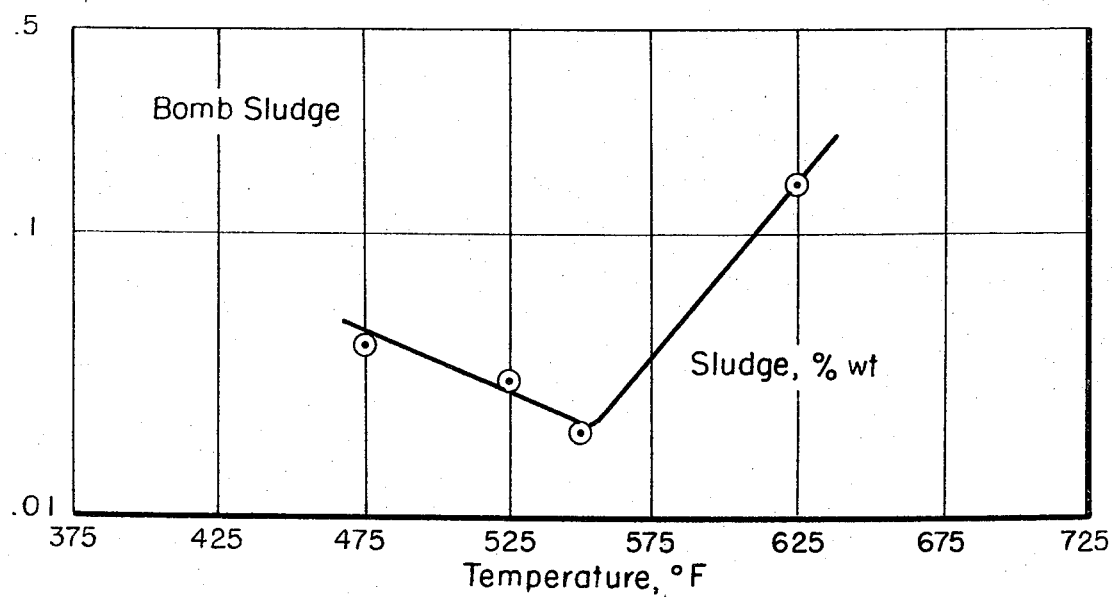

The results of processes similar to Example 1 with variation in the hydrotreating temperature with respect to the Sludge Accumulation Test, the Michie Test, the Rotary Bomb Test, the Bomb Sludge Test, the G.E. Impulse Strength Test and Resistivity are depicted graphically in FIGS. 1 and 2.

It will be seen from these reported results that operation at 575°F. or above resulted in a product having unacceptable sludge characteristics, as well as poor results in the Rotary Bomb test. Operation at 525°F. or below results in poorer performance in the simulated transformer tests and poorer impulse strength ratings. It is evident from the above that it is essential in achieving the improved transformer oil described herein that the hydrotreating of the specified charge be carried out at a temperature not less than 525°F. and below 575°F.

We claim:

1. A process for manufacturing a transformer oil which consists essentially of selecting a naphthenic distillate boiling in the range of about 450°F. to about 775°F., characterized by an aromatics content less than 30 percent, an alkane content less than 5 percent, the balance being substantially all naphthenes and having a flash point not less than about 275°F., a viscosity at 100°F. of from about 55 to about 75 SUS and a specific gravity of about 0.865 to about 0.905; contacting said distillate with hydrogen in the presence of a hydrogenation catalyst at a temperature of about 550°F. at a pressure in the range from about 200 to about 5,000 psig, at a space velocity between about 0.2 and about 5 volumes per hour per volume of catalyst and a hydrogen circulation rate from about 250 to about 15,000 s.c.f. per barrel percolating the resulting hydrotreated oil through clay, utilizing a volume ratio of oil to clay between about 5 and about 10 and recovering from such operation a product constituting a transformer oil.

2. The process of claim 1 wherein said naphthenic distillate has a boiling range of about 525° to 700°F. and an aromatics content of 18 to 25 percent.

3. The process of claim 1 wherein said contacting takes place at a pressure in the range from about 250 to about 1,000 psig, at a space velocity of about 0.5 to about 2 volumes per hour per volume of catalyst and a hydrogen circulation rate from about 500 to about 2,000 s.c.f. per barrel.

4. The process of claim 1 wherein said catalyst contains about 1 to about 10 weight percent of an iron group metal, expressed as the oxide, and about 5 to about 25 weight percent of a Group VI B metal, expressed as the oxide, deposited on a carrier.

5. The process of claim 1 wherein said viscosity at 100°F. is about 58 SUS.

6. The process of claim 1 wherein said naphthenic distillate has a boiling range of about 580°F. to about 680°F.

7. The transformer oil product resulting from the process of claim 1.

8. The process of claim 4 wherein said catalyst is nickel molybdate deposited on alumina.

* * * * *